US011904479B2

(12) United States Patent
Marten

(10) Patent No.: US 11,904,479 B2
(45) Date of Patent: Feb. 20, 2024

(54) METHOD FOR CONTROLLING DRIVES OF A ROBOT, AND ROBOT SYSTEM

(71) Applicant: SEW-EURODRIVE GMBH & CO. KG, Bruchsal (DE)

(72) Inventor: Dominik Marten, Stutensee (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 516 days.

(21) Appl. No.: 17/255,110

(22) PCT Filed: Jun. 6, 2019

(86) PCT No.: PCT/EP2019/025170
§ 371 (c)(1),
(2) Date: Dec. 22, 2020

(87) PCT Pub. No.: WO2019/242885
PCT Pub. Date: Dec. 26, 2019

(65) Prior Publication Data
US 2021/0268656 A1 Sep. 2, 2021

(30) Foreign Application Priority Data
Jun. 22, 2018 (DE) .......................... 102018004947.8

(51) Int. Cl.
*B25J 9/16* (2006.01)
*B25J 13/08* (2006.01)
(52) U.S. Cl.
CPC ........... *B25J 9/1671* (2013.01); *B25J 9/1607* (2013.01); *B25J 9/1633* (2013.01); *B25J 13/085* (2013.01)

(58) Field of Classification Search
CPC ...... B25J 9/1671; B25J 9/1607; B25J 9/1633; B25J 13/085; G05B 2219/40392
See application file for complete search history.

(56) References Cited

U.S. PATENT DOCUMENTS 5,835,693 A * 11/1998 Lynch .................... B25J 9/1605
345/473
9,221,174 B2 12/2015 Negishi
(Continued)

FOREIGN PATENT DOCUMENTS

DE 10138974 A1 4/2002
DE 112013003029 T5 3/2015
(Continued)

OTHER PUBLICATIONS

Keiser, Benjamin, Torque Control of a KUKA youBot Arm, Sep. 2013, University of Zurich Department of Informatics (Year: 2013).*
(Continued)

*Primary Examiner* — Adam R Mott
*Assistant Examiner* — Heather J Keniry
(74) *Attorney, Agent, or Firm* — CARTER, DELUCA & FARRELL LLP

(57) ABSTRACT

In a method for operating a computer having a user interface, e.g., a graphical and/or interactive user interface, a robot, which has members, e.g., arms, rotatable relative to each other and a tool and/or a load, are displayed graphically. One of the members is selectable from an indicated set of members, and a value of an inertial characteristic, e.g., a value of the mass, of this member is able to be inputted. The value of the mass of the member, the position of the center of mass of the member, and both the magnitude and the direction of each of the principal axes of inertia of the selected member are displayed graphically.

28 Claims, 4 Drawing Sheets

(56) References Cited

U.S. PATENT DOCUMENTS

| | | | |
|---|---|---|---|
| 10,007,280 B2 | 6/2018 | Bitterolf et al. | |
| 2005/0011250 A1* | 1/2005 | Nesbit | A63B 60/42 73/12.02 |
| 2018/0286119 A1* | 10/2018 | Felip Leon | B25J 13/085 |

FOREIGN PATENT DOCUMENTS

| | | | | |
|---|---|---|---|---|
| DE | 102015116086 A1 | | 3/2017 | |
| DE | 102015222166 A1 | | 5/2017 | |
| DE | 102015222166 A1 | * | 5/2017 | |
| EP | 1650542 A1 | * | 4/2006 | ............ G01M 1/045 |
| EP | 2954986 A1 | * | 12/2015 | ............ B25J 9/1638 |
| EP | 2954986 A1 | | 12/2015 | |
| EP | 2979825 A1 | | 2/2016 | |
| EP | 3979018 A1 | * | 4/2022 | .............. B25J 9/161 |
| JP | 2012223829 A | * | 11/2012 | |
| SE | 1350981 A | * | 8/2013 | |

OTHER PUBLICATIONS

International Search Report issued in corresponding International Application No. PCT/EP2019/025170, dated Nov. 6, 2019, pp. 1, English Translation.

Keiser, B., "Torque Control of a KUKA youBot Arm" Robotics and Perception Group at University of Zurich, Master Thesis (Sep. 2013) pp. 1-42.

Krenn, R. et al., "Dynamics Simulation and Assembly Environment for Rapid Manipulator Design" 7th ESA Workshop on Advanced Space Technologies for Robotics and Automation 'ASTRA 2002' (Nov. 2002) pp. 1-8.

* cited by examiner

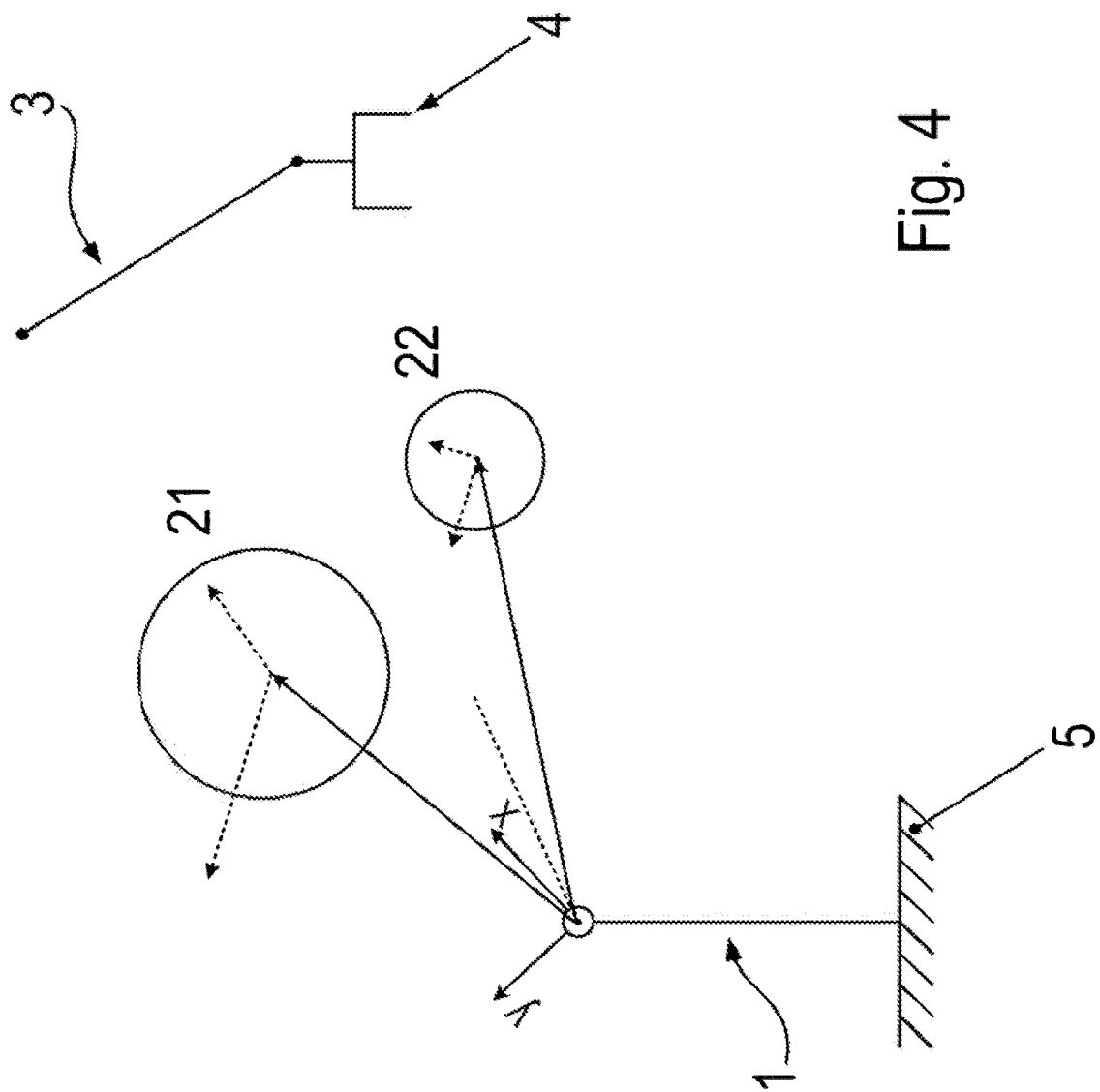

METHOD FOR CONTROLLING DRIVES OF A ROBOT, AND ROBOT SYSTEM

FIELD OF THE INVENTION

The present invention relates to a method for controlling drives of a robot, and to a robot system.

BACKGROUND INFORMATION

A robot sensitive due to a sensor system of the first robot axis is described in German Patent Document No. 10 2015 222 166.

A robot control system having a graphic display is described in German Patent Document No. 10 2015 116 086.

A robot control device that takes the inertia tensor into account is described in German Patent Document No. 11 2013 003 029.

A method for determining a load capacity in view of the inertia tensor is described in German Patent Document No. 101 38 974.

A method of saving energy for robots having a graphic display is described in European Patent Document No. 2 979 825.

A method for controlling and regulating a multibody system in view of the inertia tensor is described in European Patent Document No. 2 954 986.

SUMMARY

Example embodiments of the present invention provide a robot system that may be simply and reliably configured.

According to an example embodiment of the present invention, in a method for controlling drives of a robot: an object, e.g., a tool or load, is moved by the robot, e.g., by the drives of the robot, along a trajectory, with a velocity characteristic; at least a first of the drives of the robot moves a member, e.g., an arm, of the robot; the first drive having a controller, e.g., a torque controller, which is supplied an actual torque value and a setpoint torque value; the setpoint torque value is calculated as a sum of a precontrol value and a control output of a second controller; the second controller, e.g., a speed controller, is supplied an actual speed value, e.g., of a machine shaft, and a setpoint speed value; the member includes partial members, e.g., partial members having a uniform mass distribution; the precontrol value is determined from the velocity characteristic in view of the mass of the partial members and the inertia tensors of the partial members, e.g., and coordinates of the partial members in the frame of reference specific to the member; to graphically check the plausibility of the value of the mass, and to determine and graphically check the plausibility of the inertia tensors with the aid of the user interface of a computer connected to the control system for data transmission, a picture of a partial member is selected, in each instance, from a predefined set of different, graphically, e.g., three-dimensionally, portrayed partial members; and the mass of the partial member represented by the picture is inputted; and with the aid of the user interface of the computer, the value of the mass and of the components of the inertia tensor are represented graphically, e.g., three-dimensionally, e.g., for plausibility-checking, and are transmitted to the control system.

In this context, it is considered advantageous that after selection of the partial member, that is, after selection of the shape of the partial member, the inertial characteristics are displayed graphically in view of the inputted value for the mass and may therefore be checked for plausibility by the operator. To this end, it is particularly important that the display is spatial and, therefore, that the operator obtains a comprehensive impression.

According to an example embodiment of the present invention, in a method for operating a computer having a user interface: a robot, which has members, e.g., arms, rotatable relative to each other and a tool and/or a load, is displayed graphically; one of the members is selectable from an indicated set of members, and a value of an inertial characteristic, e.g., a value of the mass, of this member is able to be inputted; and the value of the mass of the member, the position of the center of mass of the member, and both the magnitude and the direction of each of the principal axes of inertia of the selected member is displayed graphically.

In this context, it is considered advantageous that the member is selectable from the displayed set of members in accordance with the desired shape and size, and able to be determined and graphically displayed in view of the inputted mass value of the inertia tensor, so that a plausibility check may be performed.

According to example embodiments, in a first method step, the member is made up of selected partial members in a multipart manner, and values of the inertial characteristics, in particular, values of the masses, of these partial members may be inputted; in a second method step, the value of the mass of each of the partial members, the position of the center of mass of each of the partial members, and both the magnitude and the direction of each of the principal axes of inertia of each of the selected partial members are displayed graphically. In this context, it is considered that the member may be constructed to have multiple parts, and that the inertial characteristics of all partial members may be displayed and compared to each other graphically. Consequently, a check for plausibility may readily be performed.

According to example embodiments, the value of the respective mass may be indicated, using a graphic display of a sphere, the size of the displayed sphere, e.g., the radius of the sphere, corresponding to the value of the mass. In this instance, it is considered advantageous that the mass is represented graphically in a simple manner.

According to example embodiments, a robot is configured with the aid of the inputted data and values, and the inputted values are transmitted from the computer to a control system of the robot. In this context, it is considered advantageous that simple configuring is feasible, and that the values determined and checked for plausibility on the computer may be transmitted to the control system and used there for controlling the trajectory.

According to an example embodiment of the present invention, a robot system for implementing the above-mentioned method includes a robot, a control system, and a computer having a user interface.

In this context, it is considered advantageous that the inertial quantities, that is, for example, mass and inertia tensor, may be determined as a function of the shape and mass of the partial members. These may be displayed graphically on the user interface and may therefore be checked for plausibility. Subsequently, the corresponding values may be transmitted to a control system, which controls the robot, that is, for example, the drives of the robot.

Further features and aspects of example embodiments of the present invention are explained in more detail below with reference to the appended schematic Figures.

BRIEF DESCRIPTION OF THE DRAWINGS

A robot, in particular, an industrial robot, is schematically illustrated in FIG. 1, a member 2 of the robot being selected.

An input option for the mass of selected member 2 is illustrated in FIG. 2.

Figure 1:
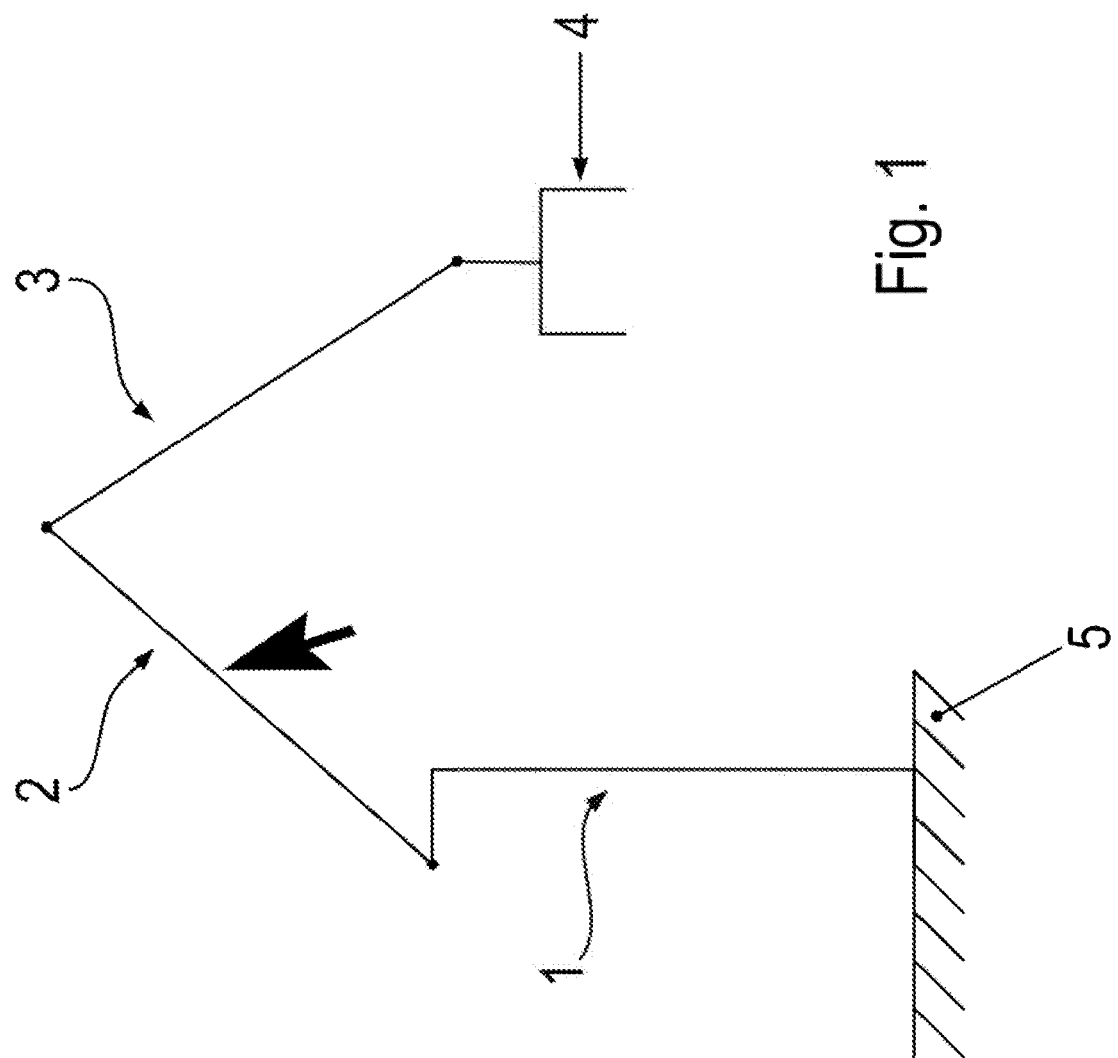
Figure 2:
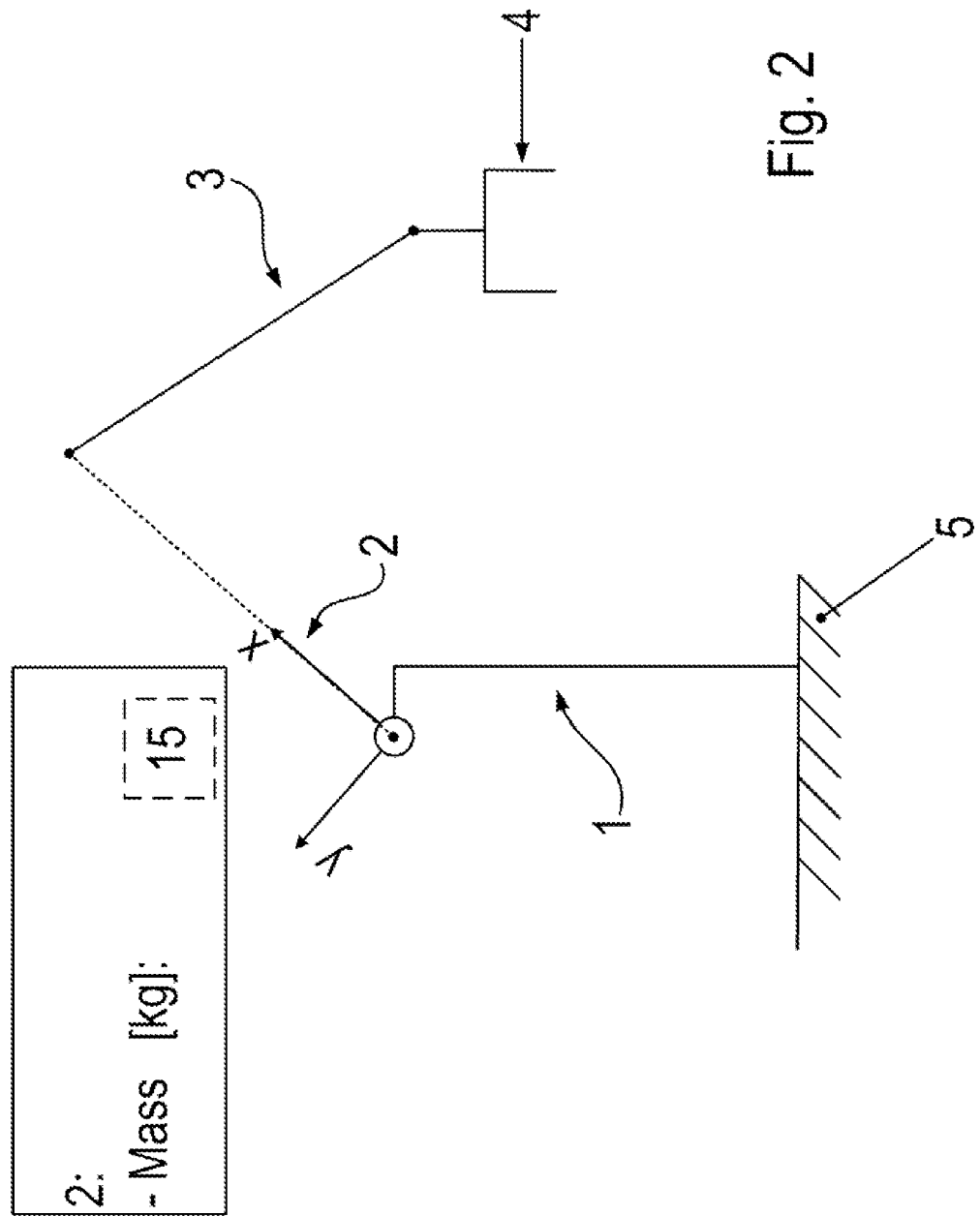
Figure 3:
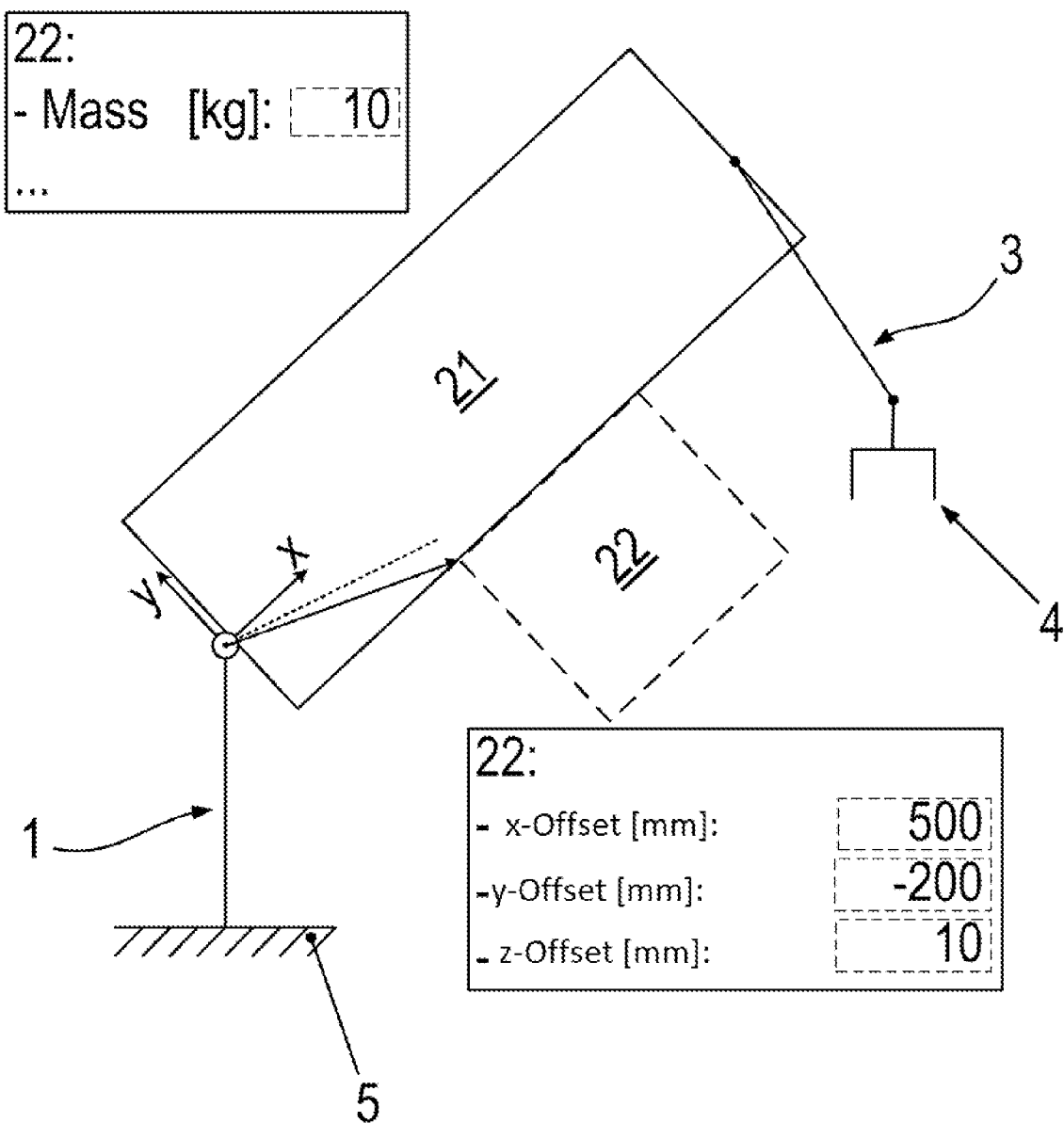
As illustrated in FIG. 3, the member includes two partial members 21, 22.

Centers of mass, including masses and principal axes of inertia of the two partial members 21, 22, are illustrated in FIG. 4.

DETAILED DESCRIPTION

As schematically illustrated in the Figures, the robot includes members 1, 2, 3, e.g., arms, for example, articulated arms, which are mounted at pivotal points so as to be able to rotate relative to each other.

First member 1 is mounted on floor 5. A second member 2 rotationally mounted to the first member is provided, and a third member 3 rotationally mounted to second member 2 is provided; a tool or a load 4 is situated on the third member.

Each pivotal point is assigned a machine shaft, that is, e.g., a gear motor, as well, which is powered by a converter and may be controlled by a control system.

The control system, together with the converter, are parameterizable and connected to a computer, which includes a graphical user interface that has input devices and display devices.

In a first configuring step, a robot, which corresponds to the robot to be controlled, is selected on the graphical user interface.

In this context, a schematic illustration according to FIG. 1 is displayed.

The clicking-on of a schematic picture of a member 2, which is symbolized in FIG. 1 by an arrow, allows for a subsequent method step, namely, the inputting of a parameter, such as mass m of member 2, as well as the input, that member 2 is constructed to have a plurality of parts.

If it has been entered, that the member is constructed to have a plurality of parts, then, in a subsequent method step, the selection of partial members 21, 22 and entry of the parameters of partial members 21, 22 of member 2 is made possible. In this instance, these parameters include the masses of partial members 21, 22 and the three spatial components of the vector, which represents the offset and/or spatial angular position of the specific member 22 with respect to the reference coordinate system or the center of mass of member 2.

The displaying of the input window is initiated by clicking.

The inputting of parameters is then allowed, e.g., the inputting of the translational and/or rotational offset of partial members 21, 22 with respect to the reference coordinate system of the overall member, that is, e.g., second member 2, that includes partial members 21, 22. In this context, the inputted values are represented graphically, e.g., with the aid of arrows or connecting lines.

In addition, as illustrated in FIG. 4, the center of mass of each partial member 21, 22 is displayed graphically, e.g., by a line from the reference point to the center of mass. Furthermore, the mass of each partial member 21, 22 is represented by the size of a sphere, whose center is positioned at the center of mass of respective partial member 21, 22. In this context, the radius of the specific sphere is proportional to the respective mass.

In addition, to represent the inertia tensor of specific partial member 21, 22 graphically, the principal axes of inertia of partial members 21, 22 are also illustrated, e.g., in each instance, in direction and magnitude, using arrows. The length of the specific arrow represents the magnitude of the respective, principal moment of inertia.

For example, the inertial characteristics are also represented by a common geometric figure, such as a right parallelepiped having a uniform mass distribution, although specific partial member 21, 22 does not have to have the shape of a right parallelepiped and does not have to have a uniform mass distribution.

In this context, the center of mass of the specific right parallelepiped may correspond to the center of mass of respective partial member 21, 22. The principal axes of inertia of the right parallelepiped are the same as the principal axes of inertia of partial member 21, 22.

With the aid of the graphical display, a check of the plausibility of the determined quantities is made possible in a simple manner. For example, the value of the mass is also graphically represented by a sphere and is therefore readily comparable to the values of mass of other partial members illustrated in the same manner.

After the determination of the inertia tensor by the computer and the graphical display on the user interface of the computer, the corresponding values and the value of the mass are transmitted from the computer to the control system and used there for determining a precontrol signal, that is, e.g., precontrol value characteristic, as a function of a predefined trajectory. The precontrol signal corresponds to a torque characteristic.

In further exemplary embodiments, the graphical displays of other members, such as of first member 1 or third member 3, may be switched on or off.

The conversion factors used for the graphical display are, e.g., adjustable, using a graphically displayed, e.g., interactive, slide control.

LIST OF REFERENCE NUMERALS 1 member, e.g., arm
2 member, e.g., arm
3 member, e.g., arm
4 load
5 floor
21 partial member
22 partial member

What is claimed is:

1. A method for controlling drives of a robot, comprising:
   moving an object by the robot along a trajectory with a velocity characteristic;
   moving a member by at least a first one of the drives of the robot, the first one of the drives including a torque controller, the member including partial members;
   supplying to the torque controller a sum of a torque value as a precontrol value and a control output of a second controller as a setpoint torque value, the second controller arranged as a speed controller;
   determining the precontrol value from the velocity characteristic in view of mass of the partial members and inertia tensors of the partial members;
   to graphically check plausibility of a value of the mass, and to determine and graphically check plausibility of the inertia tensors with the aid of a user interface of a computer connected to a control system for data transmission:
      selecting a picture of a partial member from a predefined set of different, graphically portrayed partial members; and
      inputting the mass of the partial member represented by the picture; and graphically representing, with the aid of the user interface of the computer, the value of the mass and of components of the inertia tensor and transmitting the value of the mass and of the components of the inertial tensor to the control system;
wherein the value of each mass is indicated using a graphic display of a sphere, and a size of the displayed sphere and/or a radius of the sphere corresponds to the value of the mass.

2. The method according to claim 1, wherein the object includes a tool and/or a load.

3. The method according to claim 1, wherein the object is moved by the drives of the robot.

4. The method according to claim 1, wherein the member of the robot includes an arm of the robot.

5. The method according to claim 1, wherein the second controller is arranged as a speed controller of a machine shaft.

6. The method according to claim 1, wherein the partial members have a uniform mass distribution.

7. The method according to claim 1, wherein the precontrol value is determined from the velocity characteristic in view of the mass of the partial members, the inertia tensors of the partial members, and coordinates of the partial members in a frame of reference specific to the member.

8. The method according to claim 1, wherein the predefined set of different, graphically portrayed partial members are three-dimensionally portrayed.

9. The method according to claim 1, wherein the value of the mass and of the components of the inertial tensor are graphically represented three-dimensionally.

10. The method according to claim 1, wherein the value of the mass and of the components of the inertial tensor are graphically represented for plausibility-checking.

11. A method for controlling drives of a robot, comprising:
moving an object by the robot along a trajectory with a velocity characteristic;
moving a member by at least a first one of the drives of the robot, the first one of the drives including a controller supplied with an actual torque value and a setpoint torque value calculated as a sum of a torque value as a precontrol value and a control output of a second controller, the second controller being supplied an actual speed value and a setpoint speed value, the member including partial members;
determining the precontrol value from the velocity characteristic in view of mass of the partial members and inertia tensors of the partial members;
to graphically check plausibility of a value of the mass, and to determine and graphically check plausibility of the inertia tensors with the aid of a user interface of a computer connected to a control system for data transmission:
selecting a picture of a partial member from a predefined set of different, graphically portrayed partial members; and
representing the mass of the partial member by a picture being inputted; and
with the aid of the user interface of the computer, graphically representing the value of the mass and of components of the inertia tensor, and transmitting the value of the mass and of the components of the inertial tensor to the control system;
wherein the value of each mass is indicated using a graphic display of a sphere, and a size of the displayed sphere and/or a radius of the sphere corresponds to the value of the mass.

12. The method according to claim 11, wherein the object includes a tool and/or a load.

13. The method according to claim 11, wherein the object is moved by the drives of the robot.

14. The method according to claim 11, wherein the member of the robot includes an arm of the robot.

15. The method according to claim 11, wherein the controller includes a torque controller.

16. The method according to claim 11, wherein the second controller includes a speed controller.

17. The method according to claim 11, wherein the second controller is suppled an actual speed value of a machine shaft.

18. The method according to claim 11, wherein the partial members have a uniform mass distribution.

19. The method according to claim 11, wherein the precontrol value is determined from the velocity characteristic in view of the mass of the partial members, the inertia tensors of the partial members, and coordinates of the partial members in a frame of reference specific to the member.

20. The method according to claim 11, wherein the predefined set of different, graphically portrayed partial members are three-dimensionally portrayed.

21. The method according to claim 11, wherein the value of the mass and of the components of the inertial tensor are graphically represented three-dimensionally.

22. The method according to claim 11, wherein the value of the mass and of the components of the inertial tensor are graphically represented for plausibility-checking.

23. A method for operating a computer having a user interface and/or having a graphical and/or interactive user interface, comprising:
graphically displaying a robot having members rotatable relative to each other and a tool and/or a load;
selecting one of the members from a displayed set of members;
inputting a value of an inertial characteristic of the selected member; and
graphically displaying a value of mass of the selected member, a position of a center of mass of the selected member, and both magnitude and direction of each principal axis of inertia of the selected member;
wherein the value of each mass is indicated using a graphic display of a sphere, and a size of the displayed sphere and/or a radius of the sphere corresponds to the value of the mass.

24. The method according to claim 23, wherein the members include arms.

25. The method according to claim 23, wherein the value of the inertial characteristic includes a value of a mass of the selected member.

26. The method according to claim 23, wherein the selected member includes selected partial members in a multipart manner, values of the inertial characteristics of the partial members are inputted, and the value of the mass of each of the partial members, the position of the center of mass of each of the partial members, and both the magnitude and the direction of each of the principal axes of inertia of each of the selected partial members are displayed graphically.

27. The method according to claim 23, wherein a robot is configured with the aid of the inputted data and value, and the inputted value is transmitted from the computer to a control system of the robot.

28. A robot system, comprising:
a robot;
a control system; and
a computer including a user interface;
wherein the robot system is adapted to perform:
(a) a method for controlling drives of the robot, including:
moving an object by the robot along a trajectory with a velocity characteristic;
moving a member by at least a first one of the drives of the robot, the first one of the drives including a torque controller, the member including partial members;
supplying to the torque controller a sum of a torque value as a precontrol value and a control output of a second controller as a setpoint torque value, the second controller arranged as a speed controller;
determining the precontrol value from the velocity characteristic in view of mass of the partial members and inertia tensors of the partial members;
to graphically check plausibility of a value of the mass, and to determine and graphically check plausibility of the inertia tensors with the aid of a user interface of a computer connected to a control system for data transmission:
selecting a picture of a partial member from a predefined set of different, graphically portrayed partial members; and
inputting the mass of the partial member represented by the picture; and
graphically representing, with the aid of the user interface of the computer, the value of the mass and of components of the inertia tensor and transmitting the value of the mass and of the components of the inertial tensor to the control system; and/or
(b) a method for controlling drives of the robot, including:
moving an object by the robot along a trajectory with a velocity characteristic;
moving a member by at least a first one of the drives of the robot, the first one of the drives including a controller supplied with an actual torque value and a setpoint torque value calculated as a sum of a torque value as a precontrol value and a control output of a second controller, the second controller being supplied an actual speed value and a setpoint speed value, the member including partial members;
determining the precontrol value from the velocity characteristic in view of mass of the partial members and inertia tensors of the partial members;
to graphically check plausibility of a value of the mass, and to determine and graphically check plausibility of the inertia tensors with the aid of a user interface of a computer connected to a control system for data transmission:
selecting a picture of a partial member from a predefined set of different, graphically portrayed partial members; and
representing the mass of the partial member by a picture being inputted; and
with the aid of the user interface of the computer, graphically representing the value of the mass and of components of the inertia tensor, and transmitting the value of the mass and of the components of the inertial tensor to the control system;
wherein the value of each mass is indicated using a graphic display of a sphere, and a size of the displayed sphere and/or a radius of the sphere corresponds to the value of the mass.

* * * * *